(12) United States Patent
Kim

(10) Patent No.: US 8,029,001 B2
(45) Date of Patent: Oct. 4, 2011

(54) ACTIVE ROLL CONTROL SYSTEM

(75) Inventor: Sung Jun Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 141 days.

(21) Appl. No.: 12/498,819

(22) Filed: Jul. 7, 2009

(65) Prior Publication Data
US 2010/0032913 A1 Feb. 11, 2010

(30) Foreign Application Priority Data
Aug. 11, 2008 (KR) .................. 10-2008-0078472

(51) Int. Cl.
*B60G 17/015* (2006.01)
(52) U.S. Cl. .................................................. 280/5.509
(58) Field of Classification Search .......... 280/5.509, 280/5.511, 5.514, 5.515, 124.103, 124.106, 280/124.107
See application file for complete search history.

(56) References Cited

U.S. PATENT DOCUMENTS

| 5,186,486 A |   | 2/1993 | Hynds et al. |
| 5,306,038 A | * | 4/1994 | Henderson, Jr. ............. 446/466 |
| 5,700,026 A | * | 12/1997 | Zalewski et al. ........... 280/6.152 |
| 7,237,779 B2 | * | 7/2007 | Kondo et al. ............. 280/6.157 |

FOREIGN PATENT DOCUMENTS

| JP | 2004-268902 A |   | 9/2004 |
| JP | 2005-178690 A |   | 7/2005 |
| JP | 2006290049 A | * | 10/2006 |
| JP | 2006341748 A | * | 12/2006 |

* cited by examiner

*Primary Examiner* — Faye M. Fleming
(74) *Attorney, Agent, or Firm* — Morgan, Lewis & Bockius LLP

(57) ABSTRACT

An active roll control system actively controls roll of a vehicle by changing torsional rigidity of a stabilizer bar by using change in tension of a wire connected to the stabilizer bar and both lower arms according to an operation of a pulley unit mounted at the lower arm, simplifies control thereof as a consequence that an electric motor controls operation of the pulley unit, and simplifies layout thereof.

10 Claims, 5 Drawing Sheets

ACTIVE ROLL CONTROL SYSTEM

CROSS-REFERENCE TO RELATED APPLICATION

The present application claims priority to Korean Patent Application Number 10-2008-0078472 filed Aug. 11, 2008, the entire contents of which application is incorporated herein for all purposes by this reference.

BACKGROUND OF THE INVENTION

1. Field of the Invention

The present invention relates to an active roll control system. More particularly, the present invention relates to an active roll control system (ARCS) that actively controls roll of a vehicle by changing torsional rigidity of a stabilizer bar by using change in tension of a wire according to an operation of a pulley unit mounted at an lower arm, simplifies control of the ACRS as a consequence that an electric motor controls operation of the pulley unit, and has advantages in layout.

2. Description of Related Art

Generally, a suspension system of a vehicle connects an axle to a vehicle body so as to control vibration or impact transmitted from a road to the axle when driving not to be directly transmitted to the vehicle body. Accordingly, the suspension system of a vehicle prevents the vehicle body and freight from being damaged and improves ride comfort.

Such a suspension system, as shown in FIG. 1, includes a chassis spring 101 relieving impact from the road, a shock absorber 103 reducing free vibration of the chassis spring 101 and improving the ride comfort, and a stabilizer bar 105 suppressing roll of a vehicle (it means that a vehicle inclines with reference to a length direction of the vehicle body).

Both sides of the stabilizer bar 105 is mounted at the vehicle body 107, and both ends of the stabilizer bar 105 is mounted at a lower arm 109 or a strut bar (not shown). Therefore, in a case that left and right wheels 111 move to the same direction (upward direction or downward direction), the stabilizer bar 105 does not work. On the contrary, in a case that the left and right wheels 111 move to the opposite direction (one moves upwardly and the other moves downwardly), the stabilizer bar 105 is twisted and suppresses the roll of the vehicle body 107 by torsional restoring force.

That is, when the vehicle body 107 inclines toward a turning axis by the centrifugal force in a case of turning or heights of the left and right wheels is different from each other by bump or rebound of the vehicle, the stabilizer bar 105 is twisted and stabilizes position of the vehicle body by torsional restoring force.

However, a conventional stabilizer bar 105 suppresses inclination of the vehicle or restores the inclined vehicle body 107 by only using torsional restoring force of the stabilizer bar 105, it is difficult to control roll of the vehicle quickly and precisely. In order to solve above-mentioned problem, an active roll control system provided with an actuator having a hydraulic pressure cylinder 113 connected to one end of stabilizer bar 105 and controlling the roll of the vehicle actively is developed.

According to an active roll control system that controls the roll of the vehicle actively by using the hydraulic pressure cylinder 113, one lower arm 109 is connected to one end of the stabilizer bar 105 by a stabilizer link 115 and the other lower arm 109 is connected to the other end of the stabilizer bar 105 by the hydraulic pressure cylinder 113, as shown in FIG. 2. Therefore, the active roll control system stabilizer bar 105 changes torsional rigidity of the stabilizer bar 105 by changing a length between the other end of the stabilizer bar 105 and the lower arm 109.

That is, according to the active roll control system, a lower end of the hydraulic pressure cylinder 113 is connected the other lower arm 109, and an upper end of piston rod 117 of the hydraulic pressure cylinder 113 is connected to the other end of the stabilizer bar 105 by a ball joint 119.

Therefore, an ECU controls a hydraulic pressure system including a valve and a hydraulic pressure pump based on signals output from an acceleration sensor, a vehicle height sensor, and a steering sensor, and improves the roll of the vehicle according to the active roll control system.

However, according to the conventional active roll control system, a lower end of the hydraulic pressure cylinder 113 (i.e., actuator) must be assembled to the lower arm 109 through an additional bracket 121 in order to guarantee an operational stroke thereof. However, such structures have drawbacks in mass productivity.

In addition, the hydraulic pressure supply system for supplying and controlling hydraulic pressure including a hydraulic pressure pump, a hydraulic pressure valve, and a hydraulic line is very complex according to the conventional active roll control system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an active roll control system having advantages of actively controlling roll of a vehicle by changing torsional rigidity of a stabilizer bar by using change in tension of a wire according to an operation of a pulley unit mounted at an lower arm, simplifying control thereof as a consequence that an electric motor controls operation of the pulley unit, and simplifying layout thereof.

In an aspect of the present invention, an active roll control system disposed between a lower arm and a stabilizer bar and actively improving roll of a vehicle by changing torsional rigidity of the stabilizer bar according to a driving condition of the vehicle, may include a pulley unit disposed at both lower arms, and controlling rotation of a wire pulley by using torque of a driven device connected to the wire pulley and a driving device engaged with the driven device and operated by an actuator, and a wire having one end fixed to and being selectively wound around the wire pulley of the pulley unit and the other end connected to the stabilizer bar.

The pulley unit may include a housing fixedly mounted on the both lower arms, an electric motor fixedly mounted at one end of the housing, the driving device disposed in the housing, and integrally connected to a rotation shaft of the electric motor, the driven device rotatably mounted in and supported by the housing in a state of being engaged to the driving device, and the wire pulley mounted coaxially at the driven device in the housing so as to rotate with the driven device, the wire being selectively wound on the wire pulley.

The driving device may include a worm and the driven device include a worm wheel, wherein the driving device may include a rack and the driven device include a pinion and wherein one end of the driving device is integrally connected to the rotation shaft of the electric motor, and the other end of the driving device is rotatably supported to the housing by a bearing.

In another aspect of the present invention, an active roll control system disposed between a lower arm and a stabilizer bar and actively improving roll of a vehicle by changing torsional rigidity of the stabilizer bar according to a driving condition of the vehicle may include a wire connecting the lower arm with the stabilizer bar, wherein the torsional rigidity of the stabilizer bar is changed by changing tension of the wire according to the driving condition of the vehicle.

The active roll control system may include a pulley unit mounted at the lower arm, and having a wire pulley rotated by an actuator, wherein one end of the wire is connected to one end portion of the stabilizer bar and the other end of the wire is selectively wound to the wire pulley such that the tension of the wire is changed by a rotation of the wire pulley.

The pulley unit may include a housing fixedly mounted on the both lower arms, an electric motor fixedly mounted at one end of the housing, a driving device disposed in the housing, and integrally connected to a rotation shaft of the electric motor, a driven device rotatably mounted in and supported by the housing in a state of being engaged to the driving device, and the wire pulley mounted coaxially at the driven device in the housing so as to rotate with the driven device, the wire being selectively wound on the wire pulley, wherein the driving device include a worm and the driven device include a worm wheel, wherein the driving device include a rack and the driven device include a pinion, and wherein one end of the driving device is integrally connected to the rotation shaft of the electric motor, and the other end of the driving device is rotatably supported to the housing by a bearing.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
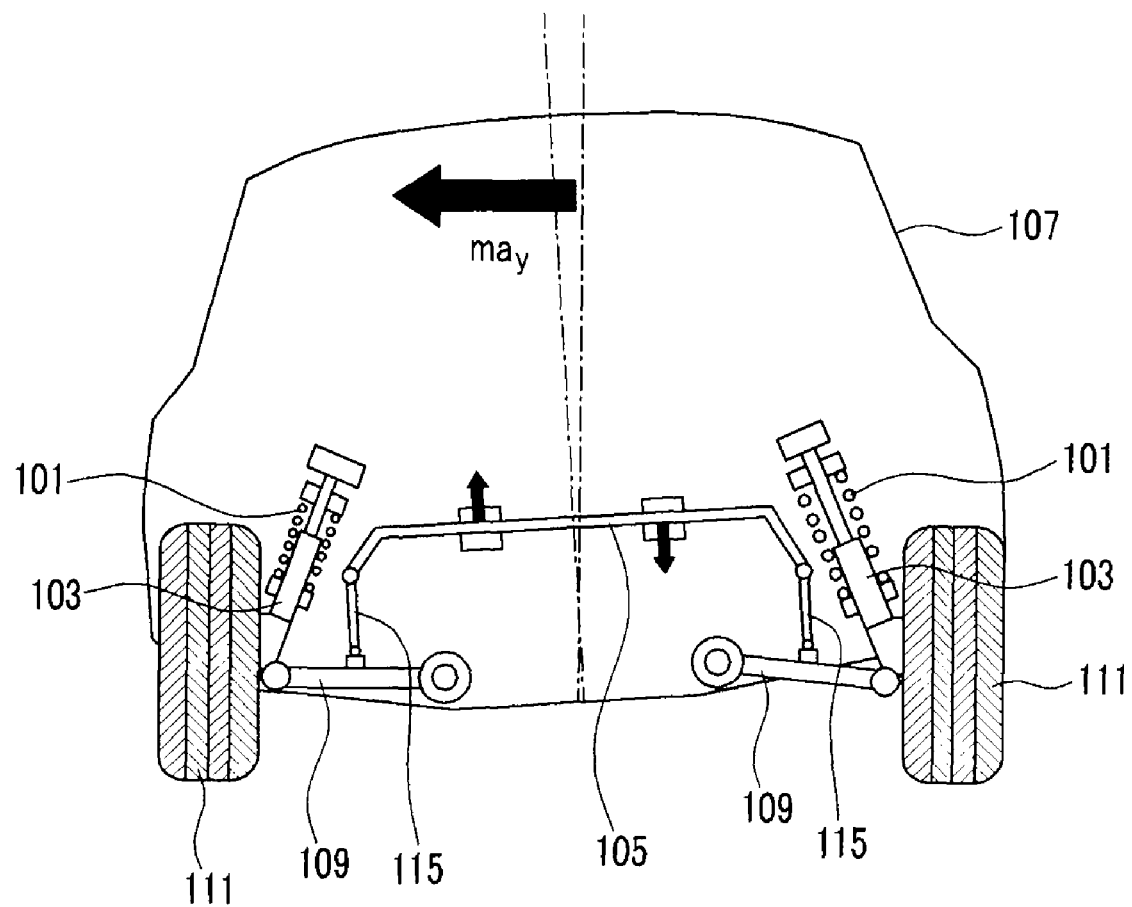
FIG. 1 is a schematic diagram of a conventional suspension system for vehicles.
Figure 2:
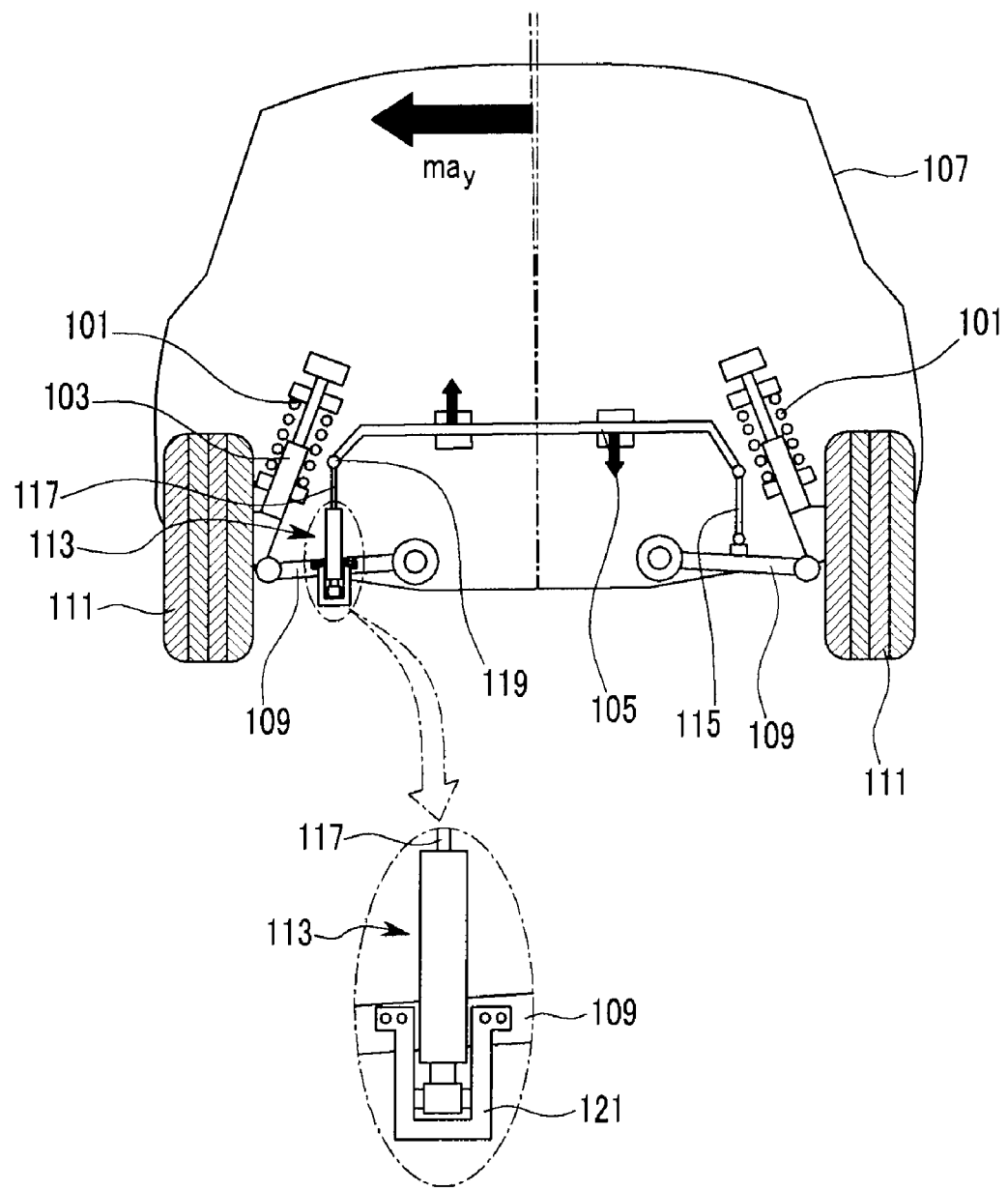
FIG. 2 is a schematic diagram of a conventional suspension system for vehicles provided with an actuator for an active roll control system.
Figure 3:
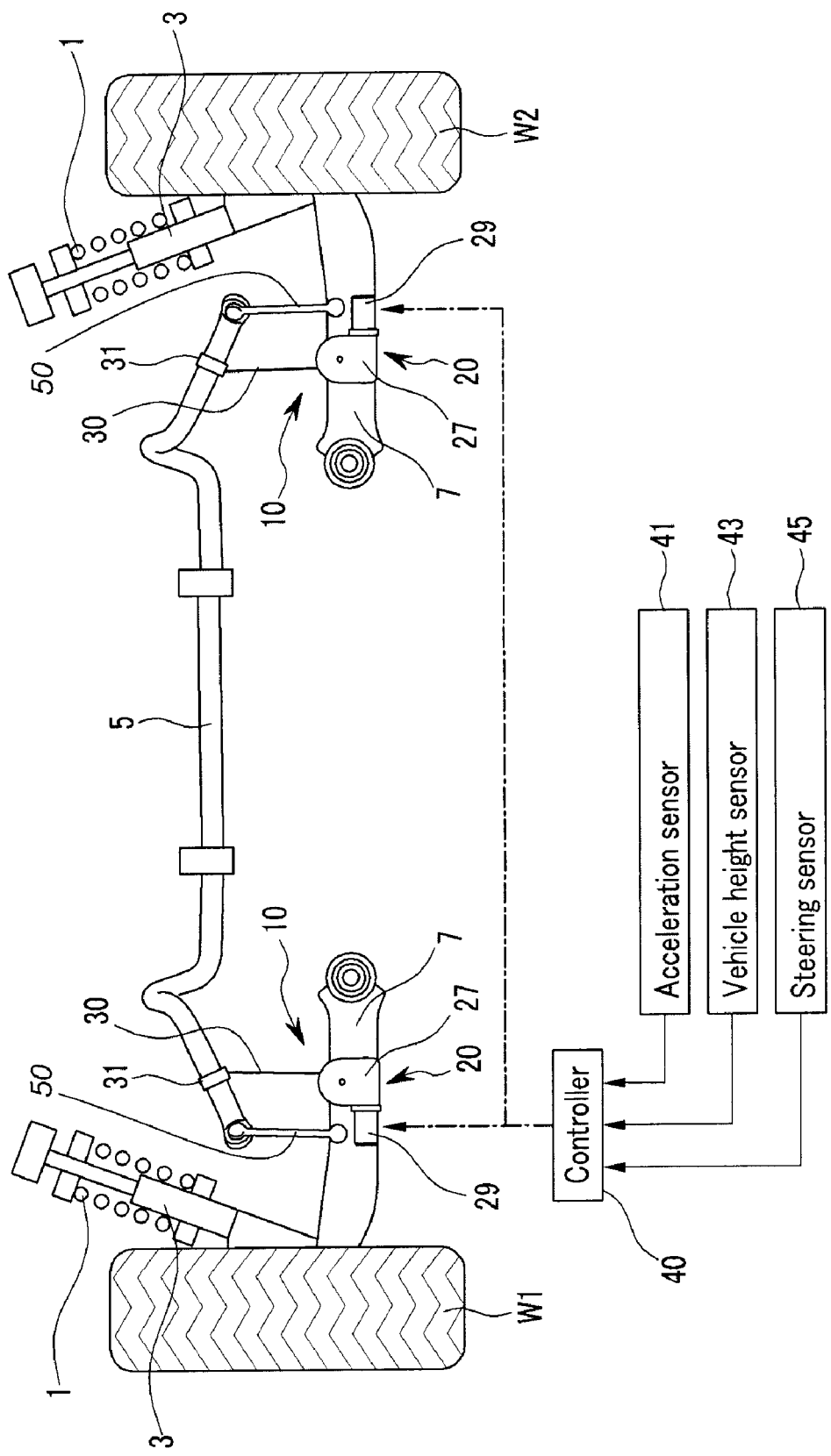
FIG. 3 is a schematic diagram of an exemplary suspension system for vehicles provided with an active roll control system according to the present invention.
Figure 4:
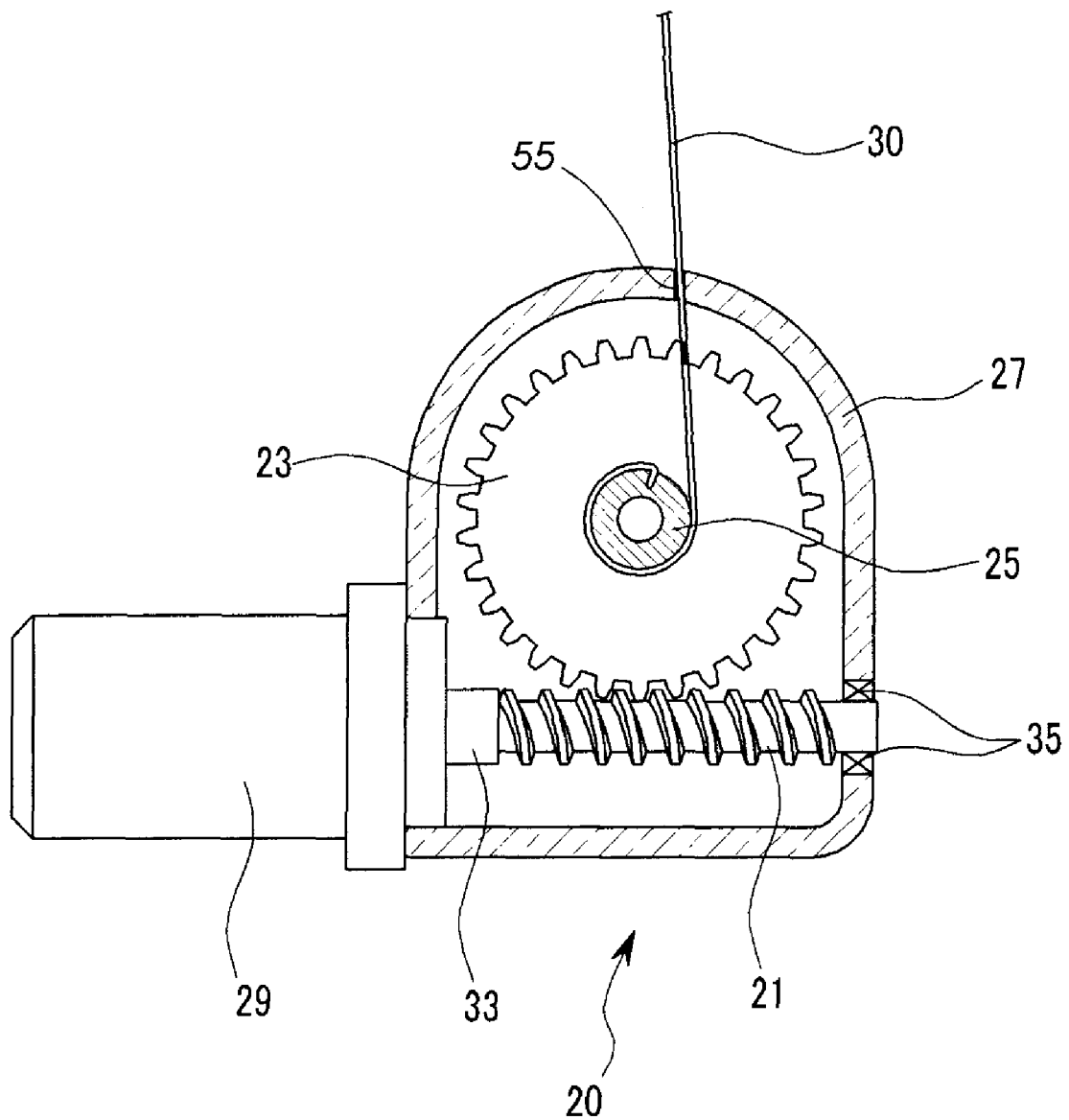
FIG. 4 is a cross-sectional view of an exemplary pulley unit applied to active roll control system according to the present invention.

FIG. 3 is a schematic diagram of a suspension system for vehicles provided with an active roll control system according to various embodiments of the present invention; and FIG. 4 is a cross-sectional view of a pulley unit applied to active roll control system according to various embodiments of the present invention.

A suspension system for vehicles provided with an active roll control system according to various embodiments of the present invention, as shown in FIG. 3, includes a chassis spring 1 relieving impact from a road and mounted between a vehicle body and an axle, a shock absorber 3 reducing free vibration of the chassis spring 1 and improving ride comfort, and a stabilizer bar 5 suppressing roll of a vehicle.

The active roll control system 10 applied to the suspension system for vehicles is disposed between a lower arm 7 disposed at both sides of the vehicle body and both ends of the stabilizer bar 5 which is connected to the lower arm 7 by a stabilizer link 50 and actively improves roll of a vehicle by changing torsional rigidity of the stabilizer bar 5 according to a driving condition of the vehicle.

That is, according to the active roll control system 10, pulley units 20 are provided respectively at lower arms 7 disposed at both sides of the vehicle body. The pulley unit 20 controls rotation of a wire pulley 25 by using torque of a worm 21 (referring to FIG. 4) of driving device operating by a motor and a worm wheel 23 of driven device.

In addition, one end of a wire 30 is wound on the wire pulley 25 of the pulley unit 20 through a hole 55 formed in the housing 27, and the other end of the wire 30 is connected to respective end of the stabilizer bar 5 through a mounter 31.

The pulley unit 20 includes a housing 27, and the housings 27 are fixedly mounted on both lower arms 7, as shown in FIG. 4.

An electric motor 29 rotating clockwise or anticlockwise according to a control signal of a controller 40 is fixedly mounted at one end of the housing 27.

In addition, the worm 21 of the driving device integrally connected to a rotation shaft 33 of the electric motor 29 is provided at a lower portion in the housing 27, and the worm wheel 23 of the driven device is rotatably mounted in the housing 27 in a state of being engaged to the worm 21.

Herein, one end of the worm 21 is integrally connected to the rotation shaft 31 of the electric motor 29, and the other end of the worm 21 is rotatably supported to the housing 27 by a bearing 35.

The wire pulley 25 is mounted coaxially with the worm wheel 23 of the driven device in the housing 27. Therefore, in a case that the worm wheel 23 rotates, the wire pulley 25 rotates together with the worm wheel 23, and winds or unwinds the wire 30.

According to the active roll control system 10, the wire 30 is wound on or is unwound from the wire pulley 25 according to an operation of the electric motor 29. Therefore, tension of the wire 30 is changed. Accordingly, the other end of the wire 30 connected to the stabilizer bar 5 through the mounter 31 changes the torsional rigidity of the stabilizer bar 5 and actively improves the roll of the vehicle.

Herein, one end of the worm 21 is integrally connected to the rotation shaft 31 of the electric motor 29, and the other end of the worm 21 is rotatably supported to the housing 27 by the bearing 35.

According to various embodiments of the present invention, the worm 21 is used as the driving device, and the worm wheel 23 is used as the driven device. However, a rack and a pinion may be used respectively as the driving device and driven device instead of the worm 21 and the worm wheel 23. It is possible that a linear motor is used as an actuator in order to use the rack as the driving device. The wire 30 may be attached to an wire pulley formed to the pinion and the rack meshed with the pinion may be actuated by the linear motor.

Figure 5:
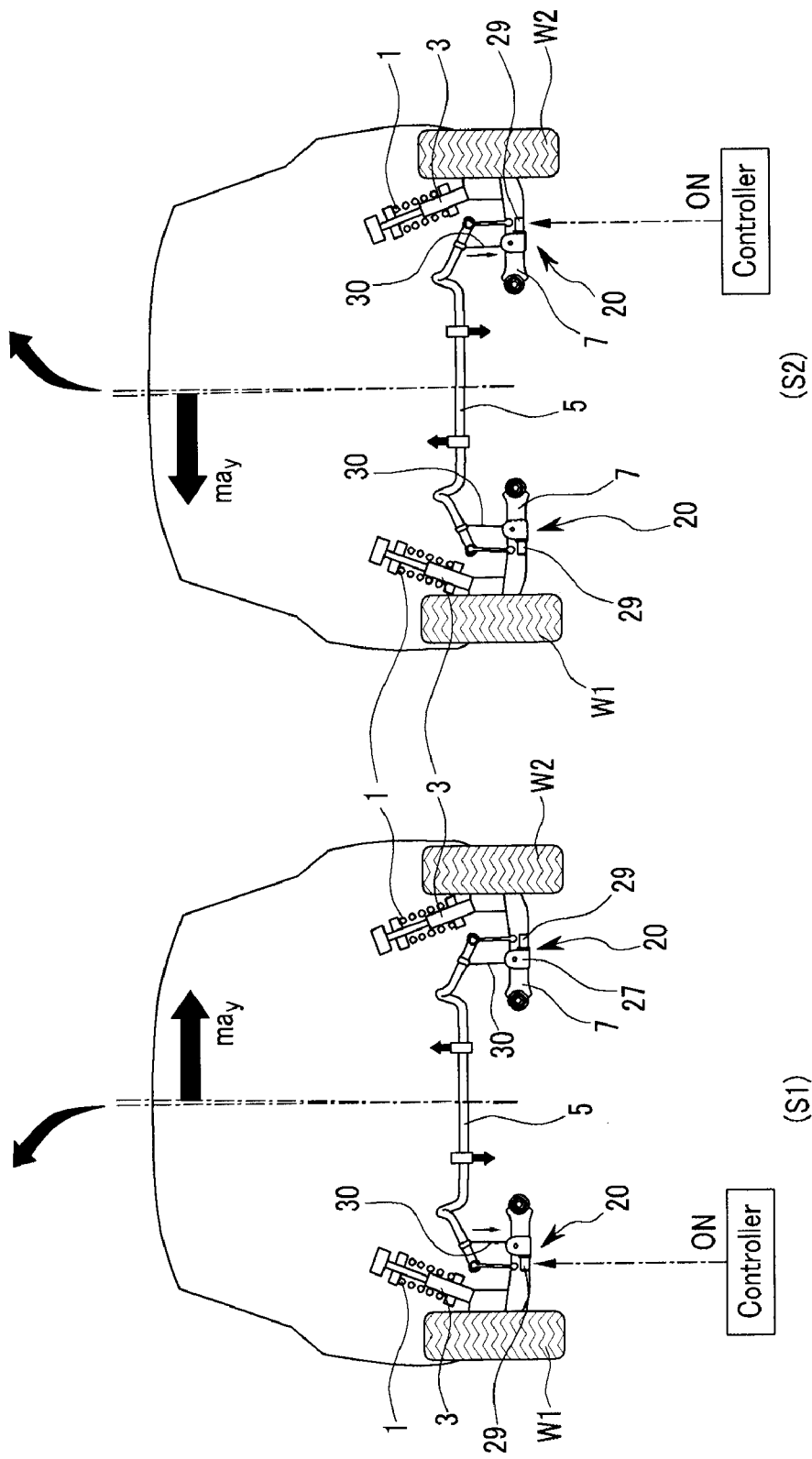
FIG. 5 is a schematic diagram showing an operation of an exemplary active roll control system according to the present invention.

An operation of the active roll control system 10 is described in detail, referring to FIG. 5.

In a case that the vehicle turns to the left, the controller 40 controls the left electric motor 29 such that the left wire 30 is wound as shown in S1 of the FIG. 5 based on signals output from an acceleration sensor 41, a vehicle height sensor 43, and a steering sensor 45. In this case, the left end of the stabilizer bar 5 near the left wheel W1 is pulled downwardly, and the torsional rigidity of the left side of the stabilizer bar 5 is strengthened. Therefore, the roll of the vehicle is suppressed.

In a case that the vehicle, on the contrary, turns to the right, the controller 40 controls the right electric motor 29 such that the right wire 30 is wound as shown in S2 of the FIG. 5 based on the signals output from the acceleration sensor 41, the vehicle height sensor 43, and the steering sensor 45. In this case, the right end of the stabilizer bar 5 near the right wheel W2 is pulled downwardly, and the torsional rigidity of the right side of the stabilizer bar 5 is strengthened. Therefore, the roll of the vehicle is suppressed.

Since the pulley units 20 are disposed on both lower arms 7 so as to wind or unwind each wire 30 connected to both sides of the stabilizer bar 5 according to the exemplary active roll control system 10 of the present invention, control of the actuator is simplified compared with an active roll control system of hydraulic pressure type. In addition, since complex hydraulic pressure supply system is not applied to the active roll control system 10, layout thereof is very simple.

In other embodiments of the present invention, the pulley units 20 may be disposed on both ends of the stabilizer bar 5 and the wire 30 may be connected to both ends of the lower arms 7.

Since connecting positions of the actuator and the stabilizer bar 5 can be controlled, the actuator of one type may be used irrespective of vehicle types.

An active roll control system according to various embodiments of the present invention can actively control roll of a vehicle by changing torsional rigidity of a stabilizer bar. In addition, control of an actuator may be simplified compared with an active roll control system of hydraulic pressure type. Further, since a hydraulic pressure supply system for supplying or controlling hydraulic pressure including hydraulic pressure pumps, hydraulic pressure valves, and hydraulic lines is not used, layout is very simple.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. An active roll control system disposed between a lower arm and a stabilizer bar and actively improving roll of a vehicle by changing torsional rigidity of the stabilizer bar according to a driving condition of the vehicle, the active roll control system comprising:
    a pulley unit disposed at both lower arms, and controlling rotation of a wire pulley by using torque of a driven device connected to the wire pulley and a driving device engaged with the driven device and operated by an actuator; and
    a wire having one end fixed to and being selectively wound around the wire pulley of the pulley unit and the other end connected to the stabilizer bar.

2. The active roll control system of claim 1, wherein the pulley unit comprises:
    a housing fixedly mounted on the both lower arms;
    an electric motor fixedly mounted at one end of the housing;
    the driving device disposed in the housing, and integrally connected to a rotation shaft of the electric motor;
    the driven device rotatably mounted in and supported by the housing in a state of being engaged to the driving device; and
    the wire pulley mounted coaxially at the driven device in the housing so as to rotate with the driven device, the wire being selectively wound on the wire pulley.

3. The active roll control system of claim 2, wherein the driving device includes a worm and the driven device include a worm wheel.

4. The active roll control system of claim 2, wherein the driving device includes a rack and the driven device include a pinion.

5. The active roll control system of claim 2, wherein one end of the driving device is integrally connected to the rotation shaft of the electric motor, and the other end of the driving device is rotatably supported to the housing by a bearing.

6. An active roll control system disposed between a lower arm and a stabilizer bar and actively improving roll of a vehicle by changing torsional rigidity of the stabilizer bar according to a driving condition of the vehicle, the active roll control system comprising:
    a wire connecting the lower arm with the stabilizer bar, wherein the torsional rigidity of the stabilizer bar is changed by changing tension of the wire according to the driving condition of the vehicle; and
    a pulley unit mounted at the lower arm, and having a wire pulley rotated by an actuator,
    wherein one end of the wire is connected to one end portion of the stabilizer bar and the other end of the wire is selectively wound to the wire pulley such that the tension of the wire is changed by a rotation of the wire pulley.

7. The active roll control system of claim 6, wherein the pulley unit comprises:
    a housing fixedly mounted on the both lower arms;
    an electric motor fixedly mounted at one end of the housing;
    a driving device disposed in the housing, and integrally connected to a rotation shaft of the electric motor;
    a driven device rotatably mounted in and supported by the housing in a state of being engaged to the driving device; and
    the wire pulley mounted coaxially at the driven device in the housing so as to rotate with the driven device, the wire being selectively wound on the wire pulley.

8. The active roll control system of claim 7, wherein the driving device includes a worm and the driven device include a worm wheel.

9. The active roll control system of claim 7, wherein the driving device includes a rack and the driven device include a pinion.

10. The active roll control system of claim 7, wherein one end of the driving device is integrally connected to the rotation shaft of the electric motor, and the other end of the driving device is rotatably supported to the housing by a bearing.

* * * * *